United States Patent [19]
Adams et al.

[11] Patent Number: 5,850,138
[45] Date of Patent: Dec. 15, 1998

[54] CONTROL CIRCUIT FOR ELECTRICAL GENERATOR

[75] Inventors: Christopher John Adams, Bedfordshire; Michael David Bailey, Herts, both of England

[73] Assignee: Lucas, Industries public limited company, West Midlands, England

[21] Appl. No.: 883,278

[22] Filed: Jun. 26, 1997

Related U.S. Application Data

[63] Continuation of Ser. No. 456,198, May 31, 1995, abandoned.

[30] Foreign Application Priority Data

Jun. 21, 1994 [GB] United Kingdom ............... 9412410

[51] Int. Cl.$^6$ .............................................. H02P 9/14
[52] U.S. Cl. .............................................. 322/68; 322/69
[58] Field of Search .................... 322/27, 28, 68, 322/69

[56] References Cited

U.S. PATENT DOCUMENTS

| | | | |
|---|---|---|---|
| 3,539,906 | 11/1970 | Habock | 322/24 |
| 4,103,217 | 7/1978 | Auinger et al. | 322/28 |
| 4,156,172 | 5/1979 | Hucker et al. | 322/68 |
| 4,486,801 | 12/1984 | Jackovich et al. | 361/21 |
| 4,639,657 | 1/1987 | Frierdich | 322/59 |
| 4,706,179 | 11/1987 | Smith | 363/126 |
| 4,764,838 | 8/1988 | MacFarlane | 361/21 |
| 5,023,539 | 6/1991 | Miller et al. | 322/28 |
| 5,194,801 | 3/1993 | Rozman | 322/28 |
| 5,508,601 | 4/1996 | Good et al. | 322/37 |

FOREIGN PATENT DOCUMENTS

| | | |
|---|---|---|
| 1174641 | 12/1969 | United Kingdom . |
| 0223362A2 | 5/1987 | United Kingdom . |
| WO86/04187 | 7/1986 | WIPO . |

*Primary Examiner*—Clayton E. Laballe
*Assistant Examiner*—Nicholas Ponomarenko
*Attorney, Agent, or Firm*—Ostrolenk, Faber, Gerb & Soffen, L.L.P.

[57] ABSTRACT

An electrical generator provides an output at a main stator winding which is excited by a main rotor winding. The main rotor winding is connected via a rectifier to a main exciter rotor winding which is excited by a main exciter field winding. A control circuit controls excitation of the main exciter field winding so as to stabilise the generator output voltage. The control circuit includes a detector for detecting excessive generator output voltage and a transistor switch for connecting a resistor in the current recirculation path of the main exciter field winding so as to prevent transient over-voltages caused by sudden load reductions.

14 Claims, 3 Drawing Sheets

CONTROL CIRCUIT FOR ELECTRICAL GENERATOR

This is a Continuation of application Ser. No. 08/456,198, filed on May 31, 1995 now abandoned.

FIELD OF INVENTION

The present invention relates to a control circuit for an electrical generator. Such a circuit may be used with an aircraft generator, for instance driven by a gas turbine engine.

BACKGROUND OF THE INVENTION

A known type of electrical generator for use with an aero-engine is disclosed in GB 1 596 291. The generator comprises three stages, each of which has a rotor and a stator with the rotors being attached to a common drive shaft. The first stage or pilot exciter comprises a permanent magnet generator having a permanent magnet rotor co-operating with three phase stator windings. The stator windings are connected via a rectifier and voltage regulator to the main exciter winding forming the stator of the main exciter. The rotor of the main exciter comprises three phase windings which are connected via a rectifier to a rotor winding of the main generator stage, which has three phase stator windings connected to the generator output. This arrangement is also applicable to variable frequency machines and DC output machines where the main generator stator winding is connected via a rectifier to give a DC generator output.

The output voltage of the generator is regulated by comparing the output voltage with a reference and controlling the voltage regulator so as to control the main exciter field. However, problems can occur when the load on the generator is reduced or removed. The generator is designed to maintain the nominal output voltage for the full electrical load and therefore is capable of providing a much higher output voltage for reduced loads. This problem exists in generators which are driven at a substantially constant rotary speed but is more severe in generators which are driven at a variable speed, for instance by a simple coupling to the engine. Such generators produce an output from the main stator windings over a wide frequency range, typically from 300 to 600 Hz. The generator is designed to provide the desired regulated voltage for full load at the lower end of the frequency range and therefore has a much higher output voltage capability at high frequencies.

When the load on the generator is reduced or removed, a voltage transient is produced at the generator output. This is particularly severe in the case of generators driven at variable rotary speeds when the actual speed of rotation is towards the top end of the speed range.

When the load is reduced or removed, the generator output voltage rises initially with a voltage step proportional to the load removed. The generator control unit removes the drive to the main exciter field winding but the generator output continues to rise in a manner determined by the time constants of the generator. This can therefore result in transient over-voltages which are beyond permissible levels and which can cause damage to equipment supplied by the generator.

U.S. Pat. No. 5,194,801 discloses an arrangement for preventing over-voltages on a power generation system generating a DC bus voltage when the load is removed or reduced. A resistor is repeatedly switched across the output of the generator by a transistor so as to act as an additional load on the generator in order to prevent or reduce the transient over-voltage. However, in order to avoid upsetting the voltage regulation of the generator, it is necessary to provide a complicated circuit in which the voltage which would be expected at the output of the generator without the loading provided by the resistor is emulated and supplied to the voltage regulator of the generator control unit. The increased complexity of the control unit is undesirable and its performance is not entirely satisfactory. Also, it is only applicable to DC systems.

SUMMARY

According to a first aspect of the invention, there is provided a control circuit for an electrical generator of the type comprising a main stator winding, for providing a generator output, excited by a main rotor winding, and a main exciter rotor winding, for energising the main rotor winding, excited by a main exciter field winding, the control circuit comprising detecting means for detecting an excessive generator output voltage, and connecting means for connecting a resistor in series with a current recirculating path of the main exciter field winding in response to detection by the detecting means.

Preferably the detecting means comprises a voltage peak detector and a comparator.

Preferably the connecting means comprises a resistor connected in parallel with a solid state switch. The solid state switch may be a power transistor, for instance an insulated gate field effect transistor. The parallel circuit formed by the resistor and the switch may be connected in series with a diode to form a series circuit for connection across the main exciter field winding to provide a recirculating path for the main exciter field current.

Preferably the circuit further comprises further detecting means for detecting short circuiting of the negative end of the main exciter field winding to a common line, and disconnecting means for disconnecting power from the main field winding in response to detection by the further detecting means.

According to a second aspect of the invention, there is provided a control circuit for an electrical generator of the type comprising a main stator winding for providing a generator output, excited by a main rotor winding, and a main exciter rotor winding, for energising the main rotor winding, excited by a main exciter field winding, the control circuit comprising further detecting means for detecting short circuiting of the main exciter field winding to a common line, and disconnecting means for disconnecting power from the main field winding in response to detection by the further detecting means.

The disconnecting means may comprise a solid state switch, such as a power transistor of the insulated gate field effect type, arranged to be connected in series with the main field winding.

The further detecting means may comprise a comparator for comparing the voltage at the negative end of the main field winding with a predetermined voltage. The output of the comparator may be connected to a latch.

The further detecting means may be responsive to the detecting means so as to permit actuation of the disconnecting means only when the detecting means also detects an excessive generator output voltage.

It is thus possible to provide a relatively simple and reliable arrangement for preventing transient over-voltages at the output of a generator. Upon detection of an excessive output voltage, for instance caused by the reduction or removal of the generator load, the resistor is connected in the current recirculating path of the main field winding. The energy stored in the main exciter field is thus dissipated relatively quickly and reduces the peak voltage occurring during the transient conditions. Also, on detection of a main exciter field winding short circuit to ground fault, the field supply is disconnected, thus limiting the peak voltage. It is thus possible to limit the generator output voltage to acceptable levels, even during transient conditions such as load reduction or removal and short circuit main exciter field winding to ground fault conditions, by means, which are suitable for use with both fixed frequency and variable frequency generators, having AC or rectified AC (DC) outputs.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
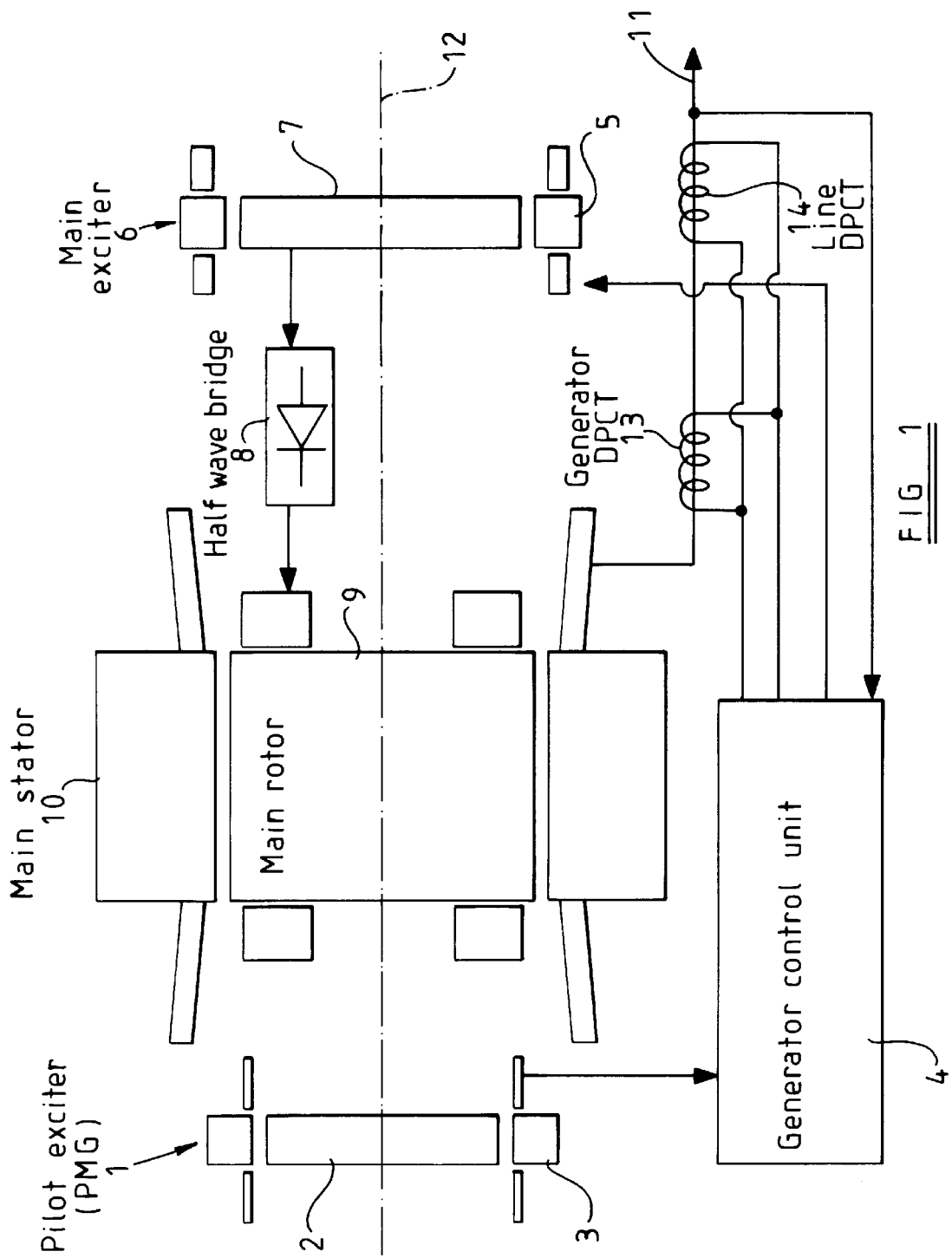
FIG. 1 is a diagram of a generator and generator control unit constituting an embodiment of the invention.

The aircraft variable frequency electrical generator shown in FIG. 1 comprises a pilot exciter 1 in the form of a permanent magnet generator (PMG) having a permanent magnet rotor 2 and a three phase stator winding 3. The stator winding 3 is connected to a generator control unit 4. The unit 4 supplies power from the winding 3 to a stator field winding 5 of a main exciter 6. The main exciter 6 has a three phase rotor winding 7 connected via a half wave bridge rectifier 8 to a rotor winding 9 of a main rotor of the generator. A main stator 10 has a three phase winding which is connected as the output 11. The main rotor 9 together with the rotor winding 7 and the permanent magnet rotor 2 are fixed to a common shaft 12 so as to rotate together. The shaft 12 is connected via a suitable coupling to an aircraft engine.

The control unit 4 is connected to a generator differential protection current transformer 13 and to a line differential protection current transformer 14. The transformers 13 and 14 monitor the current at the output of the generator main stator winding and in the line connected to the output 11 so as to signal to the control unit 4 the output current of the generator and possible fault conditions. The control unit 4 has an input connected to the output 11 for monitoring the output voltage of the generator.

Figure 2:
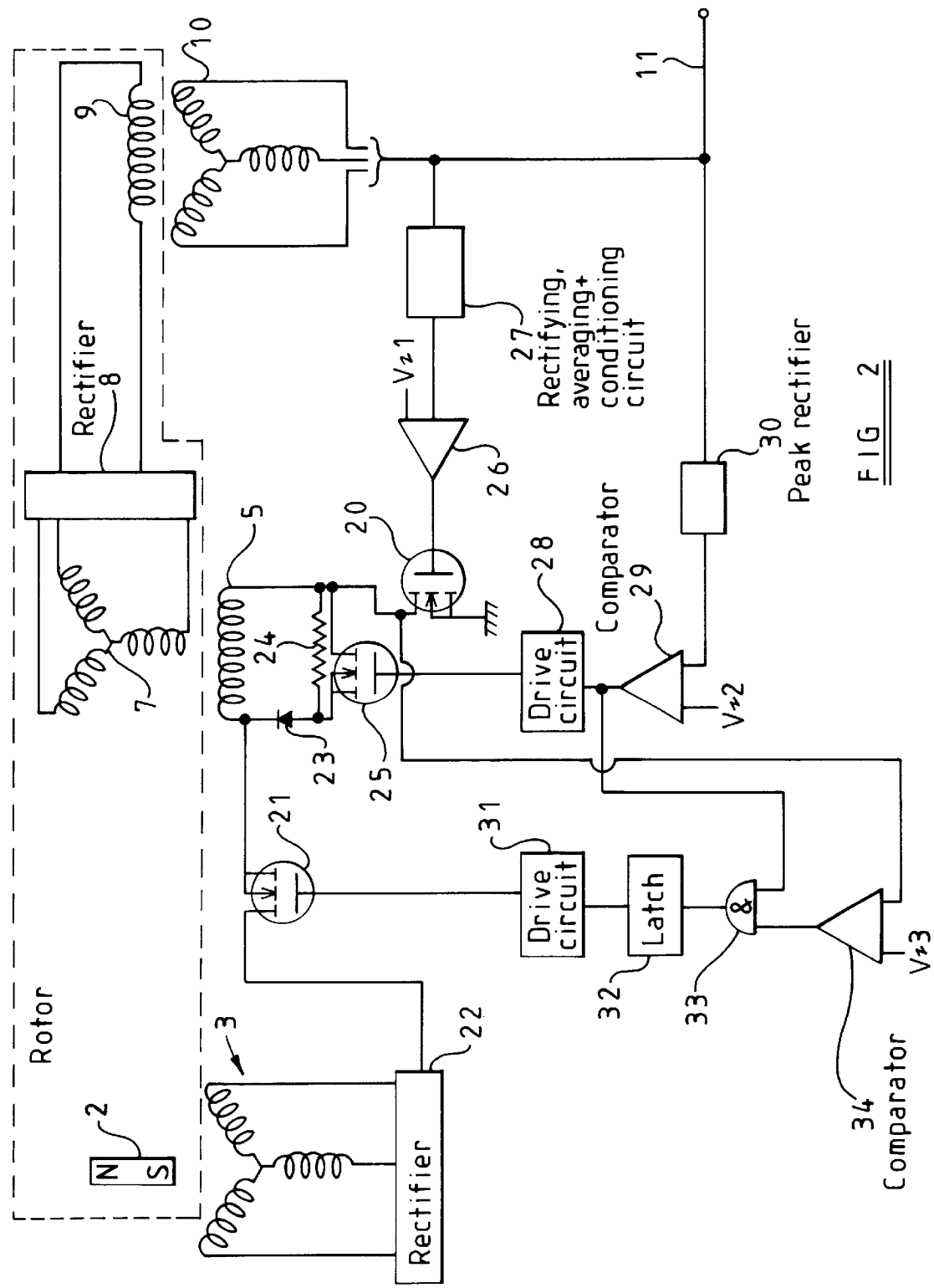
FIG. 2 is a block circuit diagram showing the generator and part of the generator control unit of FIG. 1 in more detail.

The control unit 4 is shown in more detail in FIG. 2. The main exciter field winding 5 is connected in series with insulated gate power field effect transistors 20 and 21 between a common line and the output of a rectifier 22 whose input is connected to the stator winding 3 of the pilot exciter 1. The main exciter field winding 5 is connected in parallel with a series circuit comprising a diode 23 and parallel circuit comprising a resistor 24 and an insulated gate power field effect transistor 25.

The gate of the transistor 20 is connected to the output of a differential amplifier 26 having a first input connected to receive a reference voltage Vr1 and a second input connected via a rectifying, averaging and conditioning circuit 27 to the output 11.

The gate of the transistor 25 is connected to the output of a drive circuit 28 whose input is connected to the output of a comparator 29. The comparator 29 has a first input connected to receive a reference voltage Vr2 and a second input connected to the output of a peak rectifier 30. The input of the peak rectifier 30 is connected to the output 11.

The gate of the transistor 21 is connected to the output of a drive circuit 31 whose input is connected to the output of a latch 32. The input of the latch 32 is connected to the output of an AND gate 33 having a first input connected to the output of the comparator 29 and a second input connected to the output of a comparator 34. The comparator 34 has a first input connected to receive a reference voltage Vr3 and a second input connected to the end of the field winding 5 connected to the transistor 20.

At least part of the control circuit 4 may be implemented as an application specific integrated circuit.

During normal operation of the generator, the transistors 21 and 25 are switched on so that the output of the rectifier 22 is supplied to the field winding 5 and the resistor 24 is short-circuited. The differential amplifier 26 compares the output voltage of the generator with the reference voltage Vr1 and controls the transistor 20 so as to regulate the main exciter field by varying the current through the main exciter winding 5. The current supplied by the rotor winding 7 via the rectifier 8 to the rotor winding 9 is thus controlled so as to vary the output of the main stator winding 10 in order to regulate the generator output voltage at the generator output 11.

The peak rectifier 30 monitors the instantaneous peak voltage output at the output 11. When this voltage exceeds a predetermined level represented by the reference voltage Vr2, the comparator 29 switches the transistor 25 off via the drive circuit 28 so that the resistor 24 is connected in series with the current recirculating path of the field winding 5. The differential amplifier 26 will have switched off the transistor 20 so as to remove drive to the field winding 5. The recirculating field winding current is thus dissipated in the resistor 24 relatively rapidly so as to prevent the instantaneous peak output voltage of the generator from exceeding a permissible value.

The comparator 34 compares the voltage at one end of the field winding 5 with the reference voltage Vr3 in order to detect the occurrence of a short-circuit from the end of the field winding 5 to the common line or ground. When such a short circuit is detected and when the comparator 29 signals a large instantaneous peak output voltage of the generator, the AND gate 33 triggers the latch 32 which switches off the transistor 21 via the drive circuit 31. Drive to the main exciter field winding 5 is thus removed and cannot be restored until the latch 32 is reset. "ANDing" the outputs of the comparators 29 and 34 ensures that there is no cutting off under large loads/short circuit loads (or subsequent to load application) where the transistor 20 is on for large periods of the duty cycle.

Figure 3:
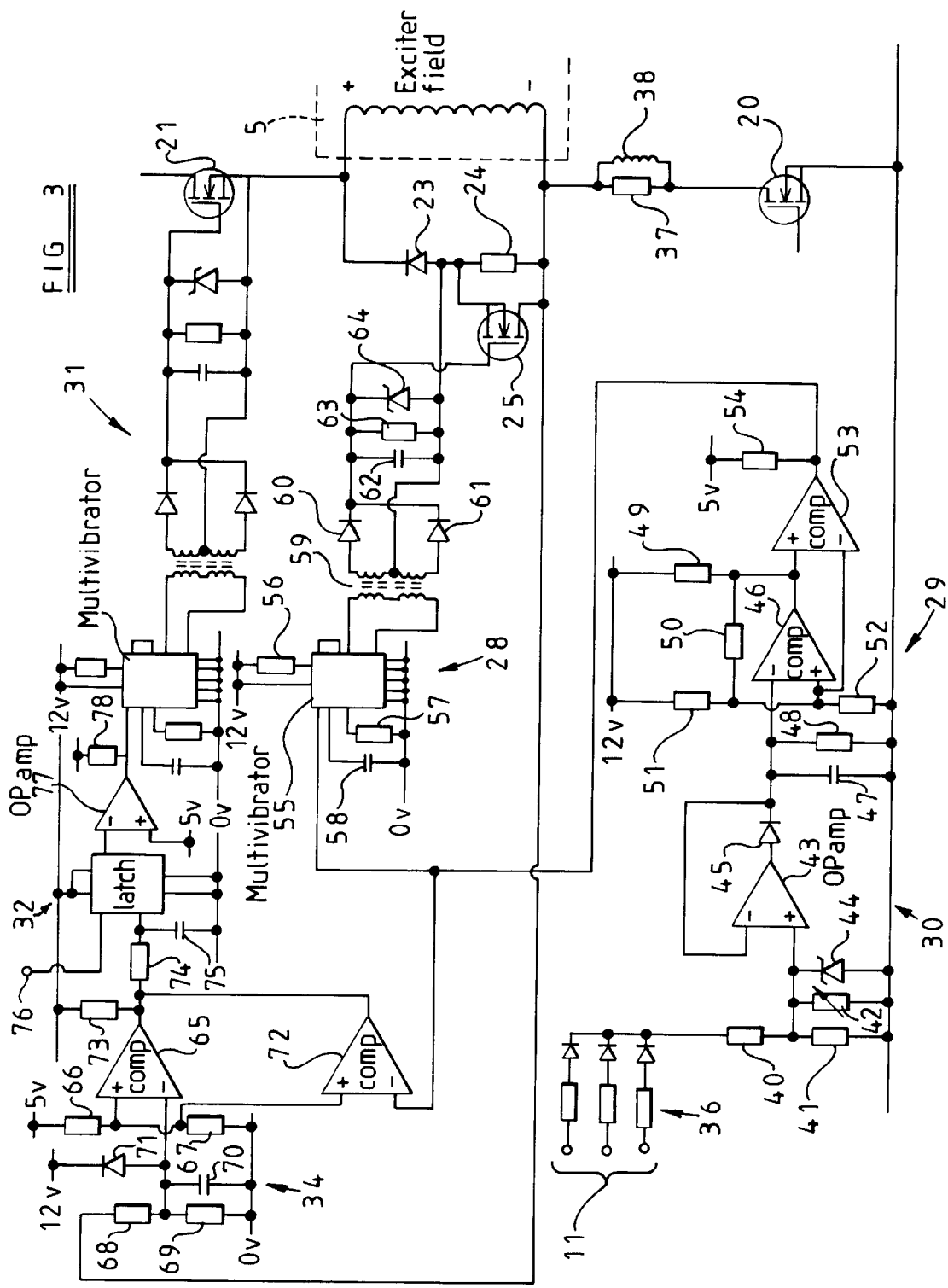
FIG. 3 is a circuit diagram showing further detail of part of the generator control unit of FIG. 1.

FIG. 3 shows part of the generator control unit in greater detail. The peak rectifier 30 comprises a three phase rectifier 36 and an input potential divider formed by fixed resistors 40 and 41 and a variable resistor 42 connected to the non-inverting input of an operational amplifier 43. A zener diode 44 protects the non-inverting input against excessive voltages. The output of the operational amplifier 43 is connected via a diode 45 to the inverting input of the operational amplifier 43 and to the inverting input of an integrated circuit comparator 46. A peak hold capacitor 47 and a bleed resistor 48 are connected in parallel between the cathode of the diode 45 and a common supply line.

The comparator 29 comprises the integrated circuit comparator 46, an output load resistor 49, a feedback resistor 50, and a potential divider comprising resistors 51 and 52. The non-inverting input of the comparator 46 is connected to the resistors 50 to 52 and to the inverting input of an integrated circuit comparator 53 whose non-inverting input is connected to the output of the comparator 46. The output of the comparator 53 is connected via a load resistor 54 to a power supply line so as to provide level shifting.

The output of the comparator 53 is connected to the drive circuit 28. The drive circuit 28 comprises a switchable oscillator formed by an astable multivibrator integrated circuit 55 provided with resistors 56 and 57 and a capacitor 58. The outputs of the integrated circuit 55 are connected to the primary winding of an isolation transformer 59 whose secondary winding is connected to a full wave rectifier comprising diodes 60 and 61. The rectifier output is smoothed by a capacitor 62 provided with a bleed resistor 63 and a voltage-limiting zener diode 64. The output voltage of the drive circuit 28 is supplied between the source and gate of the transistor 25.

The comparator 34 comprises an integrated circuit comparator 65 whose non-inverting input is connected to a potential divider comprising resistors 66 and 67. The inverting input of the comparator 65 is connected to a potential divider formed by resistors 68 and 69. The inverting input is further connected via a filtering capacitor 70 to the common supply line and via a protection diode 71 to a positive supply line.

An integrated circuit comparator 72 has its non-inverting input connected to the potential divider formed by the resistors 66 and 67 and its inverting input connected to the output of the comparator 53. The comparators 65 and 72 have a common load resistor 73, which arrangement acts as the AND gate 33. The output of the gate is connected via a resistor 74 to the set input of the latch 32 comprising an integrated circuit bistable latch. The set input is connected to the common line via a filtering capacitor 75. The reset input of the latch is connected via a reset input terminal 76 for receiving a reset control signal.

The output of the latch 32 is connected to a level shifter comprising an operational amplifier 77 and a resistor 78, whose output is connected to the drive circuit 31. The drive circuit 31 is identical to the drive circuit 28 and will not therefore be further described. The output of the drive circuit 31 is connected between the source and gate of the transistor 21.

The drain of the transistor 20 is connected to the field winding 5 via a resistor 37 and an inductor 38 connected in parallel.

The resistors 40, 41, 42, 51, and 52 are chosen such that the output of the comparator 29 goes low when the instantaneous peak output voltage at the terminal 11 exceeds nominally 130 volts. The oscillator 55 is thus disabled so that the capacitor 62 ceases to be charged via the transformer 59 and the rectifier diodes 60 and 61. The capacitor 62 is thus discharged through the resistor 63 and the transistor 25 is turned off so as to remove the short-circuit across the resistor 24.

The resistors 66 to 69 are selected so that the output of the comparator 65 tries to go high when the voltage at the negative end of the exciter field winding 5 falls below a predetermined value indicative, for instance, of a short-circuit to ground. If the output of the comparator 72 is similarly aiming high, then the output goes high and the latch 32 is set so that drive is removed from the gate of the transistor 21 which turns off and disconnects the field winding 5 from the rectifier 22 and the stator winding 3. The generator is thus disabled and can be re-enabled by a reset switch at the terminal 76.

It is thus possible to provide a generator control unit which prevents excessive transient over-voltages appearing at the output of the generator when the generator load is reduced or removed. The unit acts sufficiently quickly to prevent potentially damaging over-voltages from being supplied to equipment connected to the generator. Further, in the event of a short circuit or other drive fault occurring at the field winding 5 or within the comparator and reference stage 26 and Vr1 (which give fault conditions similar to a short circuit from the field winding to ground), the generator is disabled so as to prevent the equipment from being subjected to excessively high output voltages. The control unit is capable of preventing excessive transient over-voltages particularly in the case of a variable frequency generator whose rotor speed varies within wide limits.

We claim:

1. A control circuit for an electrical generator of the type comprising a main stator winding for providing a generator output, said main stator winding being excited by a main rotor winding, a main exciter rotor winding for energizing said main rotor winding, and a main exciter field winding for exciting said main exciter rotor winding, the control circuit comprising a detector for detecting an excessive generator output voltage, and a current recirculation path connected across said main exciter field winding, said current recirculation path including a resistor and a first switch for connecting said resistor in series in said current recirculation path in response to detection by said detector of an excessive generator output voltage, the control circuit having a forward current path including a second switch and the main exciter field winding, said forward current path excluding said resistor and said first switch.

2. A circuit as claimed in claim 1 in which said detector comprises a voltage peak detector and a comparator.

3. A circuit as claimed in claim 1 in which said first switch comprises a first solid state switch connected in parallel with said resistor.

4. A circuit as claimed in claim 3, in which said first solid state switch comprises a first transistor.

5. A circuit as claimed in claim 3, in which said current recirculation path comprises a diode connected in series with said first solid state switch and said resistor.

6. A circuit as claimed in claim 1, further comprising a common line, a second detector for detecting short circuiting of said main exciter field winding to said common line, said second switch being responsive to said second detector for disconnecting power from said main exciter field winding when said second detector detects said short circuiting.

7. A circuit as claimed in claim 6, in which said second detector is responsive to said first detector so as to permit actuation of said second switch only where said first detector detects said excessive generator output voltage.

8. A circuit as claimed in claim 6, in which said second switch comprises a solid state switch for connection in series with said main exciter field winding.

9. A circuit as claimed in claim 8, in which said second solid state comprises a second transistor.

10. A circuit as claimed in claim 6, in which said second detector comprises a comparator for comparing a voltage at a negative end of said main exciter field winding with a predetermined voltage.

11. A circuit as claimed in claim 10, further comprising a latch connected to said comparator.

12. A control circuit for an electrical generator of the type including a main stator winding for providing a generator output excited by a main rotor winding, and a main exciter rotor winding for energizing said main rotor winding, said main exciter rotor winding being excited by a main exciter field winding; said control circuit comprising:

- a current recirculation path for said main exciter field winding;
- a resistor;
- a first detector for detecting an excessive voltage produced by said generator output against a predetermined voltage level;
- a first switch responsive to said first detector for connecting said resistor in series with said current recirculation path when said first detector detects said excessive voltage at said generator output;
- a second detector for detecting short circuiting of said main exciter field winding;
- a second switch responsive to said second detector for disconnecting power from said main exciter field winding when said second detector detects said short circuiting of said main exciter field winding.

13. A control circuit for an electrical generator of the type including a main stator winding for providing a generator output excited by a main rotor winding, and a main exciter rotor winding for energizing said main rotor winding, said main exciter rotor winding being excited by a main exciter field winding; said control circuit comprising:

- a current recirculation path for said main exciter field winding;
- a resistor;
- a first detector for detecting an excessive voltage produced by said generator output against a predetermined voltage level;
- a first switch responsive to said first detector for connecting said resistor in series with said current recirculation path when said first detector detects said excessive voltage at said generator output;
- a second detector for detecting short circuiting of said main exciter field winding;
- a second switch responsive to said second detector for disconnecting power from said main exciter field winding when said second detector detects said short circuiting of said main exciter field winding and when said first detector detects said excessive voltage at said generator output.

14. A control circuit for an electrical generator of the type comprising a main stator winding for providing a generator output, said main stator winding being excited by a main rotor winding, a main exciter rotor winding for energizing said main rotor winding, and a main exciter field winding for exciting said main exciter rotor winding, the control circuit comprising:

- a detector for detecting an excessive generator output voltage;
- a current recirculation path connected across said main exciter field winding, said current recirculation path including a resistor and a first switch coupled to normally short said resistor and to couple said resistor in series with said current recirculation path by unshorting said resistor when said detector indicates an excessive generator output voltage; and
- a forward current path including a second switch and the main exciter field winding, said forward current path excluding said resistor and said first switch.

* * * * *

UNITED STATES PATENT AND TRADEMARK OFFICE
CERTIFICATE OF CORRECTION

PATENT NO. : 5,850,138

DATED : December 15, 1998

INVENTOR(S) : Christopher J. Adams, et al.

It is certified that error appears in the above-identified patent and that said Letters Patent is hereby corrected as shown below:

Column 6, line 50, delete "said second switch being" and insert --and a third switch--.

Column 6, line 55, delete "second" and insert --third--.

Column 6, line 57, delete "second" and insert --third--.

Signed and Sealed this

Twenty-third Day of February, 1999

*Attest:*

Q. TODD DICKINSON

*Attesting Officer*      *Acting Commissioner of Patents and Trademarks*